(12) United States Patent
Kotera et al.

(10) Patent No.: US 8,440,745 B2
(45) Date of Patent: May 14, 2013

(54) NONAQUEOUS INKJET INK COMPOSITION

(75) Inventors: Takehiro Kotera, Tochigi (JP); Harumi Kaneko, Tochigi (JP); Toshihiko Shiotani, Tochigi (JP); Tetsuo Sugawa, Tochigi (JP)

(73) Assignee: Dai Nippon Toryo Co., Ltd., Osaka (JP)

( * ) Notice: Subject to any disclaimer, the term of this patent is extended or adjusted under 35 U.S.C. 154(b) by 322 days.

(21) Appl. No.: 12/921,017

(22) PCT Filed: Jan. 29, 2009

(86) PCT No.: PCT/JP2009/051407
§ 371 (c)(1), (2), (4) Date: Sep. 3, 2010

(87) PCT Pub. No.: WO2009/110266
PCT Pub. Date: Sep. 11, 2009

(65) Prior Publication Data
US 2011/0009537 A1    Jan. 13, 2011

(30) Foreign Application Priority Data

| Mar. 4, 2008 | (JP) | 2008-053331 |
| Mar. 31, 2008 | (JP) | 2008-091887 |
| Jan. 14, 2009 | (JP) | 2009-005656 |

(51) Int. Cl.
| B29C 47/00 | (2006.01) |
| B32B 7/12 | (2006.01) |
| C08F 214/06 | (2006.01) |
| C08G 18/28 | (2006.01) |
| C08G 18/42 | (2006.01) |
| C08J 3/22 | (2006.01) |
| C08K 5/00 | (2006.01) |
| C08K 5/06 | (2006.01) |
| C08K 5/16 | (2006.01) |
| C08K 5/17 | (2006.01) |
| C08K 5/34 | (2006.01) |
| C08K 5/3445 | (2006.01) |
| C08L 27/00 | (2006.01) |
| C08L 51/00 | (2006.01) |
| C09D 5/00 | (2006.01) |
| C09D 11/00 | (2006.01) |
| C09D 11/10 | (2006.01) |

(52) U.S. Cl.
USPC ........... 523/160; 523/161; 524/106; 524/186; 524/198; 524/236; 524/257; 524/377; 524/527; 524/539; 524/567

(58) Field of Classification Search ................. 523/160, 523/161; 524/106, 186, 198, 236, 257, 377, 524/527, 539, 567
See application file for complete search history.

(56) References Cited

U.S. PATENT DOCUMENTS 3,341,461 A * 9/1967 Larsen .................... 252/389.21
2005/0247916 A1* 11/2005 McCormick et al. ......... 252/500

FOREIGN PATENT DOCUMENTS

| JP | 60-152575 A | 8/1985 |
| JP | 2000-290573 A | 10/2000 |
| JP | 2005-023099 A | 1/2005 |
| JP | 2006-056990 A | 3/2006 |
| JP | 2007-327003 A | 12/2007 |
| JP | 2009-051904 A | 3/2009 |
| WO | WO 2005/019360 | * 3/2005 |
| WO | WO 2006/093398 | * 9/2006 |

* cited by examiner

Primary Examiner — Patrick Niland
(74) Attorney, Agent, or Firm — Frommer Lawrence & Haug LLP; Ronald R Santucci

(57) ABSTRACT

Disclosed is a nonaqueous inkjet ink composition having excellent ink ejection stability, which does not clog a nozzle of a printer head portion when used for printing by an inkjet printer, thereby enabling achievement of a printed matter having excellent print quality. The nonaqueous inkjet ink composition is characterized by containing a pigment, a resin, a pigment dispersing agent, an organic solvent, and additionally a rust inhibitor.

7 Claims, No Drawings

NONAQUEOUS INKJET INK COMPOSITION

This application is a 371 of PCT/JP2009/051407 filed on Jan. 29, 2009, published on Sep. 11, 2009 under publication number WO 2009/110266 A which claims priority benefits from Japanese Patent Application No. 2008-053331 filed Mar. 4, 2008 and Japanese Patent Application No. 2008-091887 filed Mar. 31, 2008 and Japanese Patent Application No. 2009-005656 filed Jan. 14, 2009, the disclosures of which are incorporated herein by reference.

TECHNICAL FIELD

The present invention relates to a nonaqueous inkjet ink composition, and more particularly, to a nonaqueous inkjet ink composition that does not clog a nozzle in a printer head upon printing on an inkjet printer and provides high ink-discharge stability to ensure high-quality printed matter.

BACKGROUND ART

Many pigment-based ink compositions for inkjet printing using various solvents have been proposed thus far. When used in printing printed matter, however, these pigment-based ink compositions tend to clog nozzles of inkjet printers, resulting in printed matter with decreased printing quality. Also, the printed matter printed using such pigment-based ink compositions may not necessarily achieve sufficient color expression.

In particular, ink compositions using strong organic solvents, acidic or basic pigments and other additives are likely to corrode the nozzles of a printer head, providing a major cause of nozzle clogging.

PTL 1 discloses a technique to prevent corrosion of electrodes mounted on a piezoelectric element by using an ink composition containing an ethanolamine compound. When added to an ink, however, these anticorrosive agents can cause pigments or resins dispersed in the ink to coagulate and clog nozzles during long-term storage. Thus, such inks have unfavorable dispersion stability.

CITATION LIST

Patent Literature

{PTL 1} JP-A-2005-23099

SUMMARY OF INVENTION

Technical Problem

The present invention has been devised to solve the above-described problems and, accordingly, an object of the present invention is to provide a nonaqueous inkjet ink composition that can prevent corrosion of inkjet printer heads to keep the nozzles from being clogged and has high dispersion stability.

Solution to Problem

In an effort to achieve the above-described object, the present inventors have found that a favorable nonaqueous inkjet ink composition can be obtained by adding an anticorrosive agent, such as an imidazole compound and a volatile anticorrosive agent, to the ink composition. It is this finding that ultimately led to the present invention.

According to the present invention, there is provided a nonaqueous inkjet ink composition that contains a pigment, a resin, a pigment-dispersing agent and an organic solvent, along with an anticorrosive agent.

The use of the nonaqueous inkjet ink composition of the present invention can not only prevent corrosion of inkjet printer heads to keep the nozzles from being clogged, but also provide high dispersion stability.

DESCRIPTION OF EMBODIMENTS

The nonaqueous inkjet ink composition of the present invention will now be described in specific details.

It is necessary that the nonaqueous inkjet ink composition of the present invention contain a pigment, a resin, a pigment-dispersing agent and an organic solvent, along with an anticorrosive agent, such as an imidazole compound and a volatile corrosion inhibitor.

The above-described components of the nonaqueous inkjet ink composition of the present invention will now be described.

The pigments for use in the nonaqueous inkjet ink composition of the present invention include the following:

Pigment Yellow 12, 13, 14, 17, 20, 24, 31, 55, 74, 83, 86, 93, 109, 110, 117, 120, 125, 128, 129, 137, 138, 139, 147, 148, 150, 151, 153 (Nitrone-based nickel complex yellow), 154, 155, 166, 168, 180, 181, 185

Pigment Orange 16, 36, 38, 43, 51, 55, 59, 61, 64, 65, 71

Pigment Red 9, 48, 49, 52, 53, 57, 97, 122 (Quinacridone Magenta), 123, 149, 168, 177, 180, 192, 202, 206, 215, 216, 217, 220, 223, 224, 226, 227, 228, 238, 240, 244, 254

Pigment Violet 19 (Quinacridone Violet) 23, 29, 30, 32, 37, 40, 50

Pigment Blue 15 (Phthalocyanine Blue), 15:1, 15:3, 15:4, 15:6, 22, 30, 64, 80

Pigment Green 7 (Chlorinated Phthalocyanine Green), 36 (Brominated Phthalocyanine Green)

Pigment Brown 23, 25, 26

Pigment Black 7 (Carbon Black), 26, 27, 28

Titanium oxide, iron oxide, ultramarine, chrome yellow, zinc sulfide, cobalt blue, barium sulfate, and calcium carbonate.

Titanium oxide may be titanium dioxide commonly used in paints and may be provided in the form of either anatase or rutile crystalline form. Rutile form is preferred because of its weather-proof properties.

While the pigment may be added in any amount determined depending on the type of the pigment used and other factors, it is typically added in an amount of 0.1 to 20 wt % and preferably in an amount of 0.5 to 10 wt % with respect to the weight of the ink composition. When the pigment is titanium oxide, it is preferably added in an amount of 1.0 to 20.0 wt % and more preferably in an amount of 3.0 to 15.0 wt % with respect to the weight of the ink composition. If the amount of titanium oxide is less than 1.0 wt %, then the hiding power of the ink composition to hide the underlying foundation of printed matter is decreased. If the amount of titanium oxide is greater than 20.0 wt %, then titanium dioxide tends to precipitate, causing clogging of nozzles. While the average particle size of the pigment is preferably in the range of 50 to 400 nm and more preferably in the range of 80 to 300 mm, the average particle size for titanium dioxide is preferably in the range of 100 to 400 nm and more preferably in the range of 150 to 300 nm. If the average particle size is greater than 400 nm, then the pigment tends to precipitate, causing clogging of nozzles. If the average particle size is less than 50 nm, then the hiding power to hide the underlying foundation is decreased. Other disadvantages may also result.

As with common ink compositions, the nonaqueous inkjet ink composition of the present invention contains a resin as a binder. While the resin may be any resin as a binder commonly used in typical ink compositions, it is particularly preferred that the ink composition of the present invention contain any of a polyester resin, an acrylic resin and a vinyl chloride resin in order to improve adhesion to the substrate upon printing.

The polyester resin may be either a saturated polyester resin or a unsaturated polyester resin. Polyester resins are obtained by a condensation reaction between a polybasic acid and a polyol. Examples of the polybasic acids for use in the polyester resin include the following:

Aromatic dicarboxylic acids, such as phthalic acid, isophthalic acid, terephthalic acid, 1,5-naphthalenedicarboxylic acid, 2,6-naphthalenedicarboxylic acid, 9,10-anthracenedicarboxylic acid, and diphenic acid;

aromatic oxycarboxylic acids, such as p-oxybenzoic acid, and p-(hydroxyethoxy)benzoic acid;

aliphatic dicarboxylic acids, such as succinic acid, adipic acid, azelaic acid, sebacic acid, and dodecane dicarboxylic acid;

aliphatic unsaturated polycarboxylic acids, such as fumaric acid, maleic acid, itaconic acid, mesaconic acid, cyclohexene dicarboxylic acid, dimer acid, trimer acid, and tetramer acid;

alphatic dicarboxylic acids, such as hexahydrophthalic acid, and tetrahydrophthalic acid; and polycarboxylic acids such as trimellitic acid, trimesic acid, and pyromellitic acid.

Alternatively, the polybasic acid may include a monobasic acid. Examples of such monobasic acids include benzoic acid, chlorobenzoic acid, bromobenzoic acid, parahydroxybenzoic acid, t-butyl benzoic acid, naphthalenecarboxylic acid, 3-methyl benzoic acid, 4-methyl benzoic acid, salicylic acid, thiosalicylic acid, phenylacetic acid, naphthalenecarboxylic acid, anthracenecarboxylic acid, t-butyl naphthalenecarboxylic acid, and cyclohexyl aminocarbonyl benzoic acid.

Examples of the polyols for use in the polyester resin include the following:

Aliphatic diols, such as ethylene glycol, propylene glycol, 1,3-propanediol, 2,3-butanediol, 1,4-butanediol, 1,5-pentanediol, 1,6-hexanediol, neopentyl glycol, diethylene glycol, dipropylene glycol, 2,2,4-trimethyl-1,3-pentanediol, polyethylene glycol, polypropylene glycol, and polytetramethylene glycol;

aliphatic polyols including triols and tetraols, such as trimethylol ethane, trimethylolpropane, glycerin, and pentaerythritol;

aliphatic polyols, such as 1,4-cyclohexanediol, 1,4-cyclohexanedimethanol, spiro glycol, bisphenol A, hydrogenated bisphenol A, tricyclodecane diol, and tricyclodecane dimethanol; and aromatic polyols, such as paraxylene glycol, metaxylene glycol, orthoxylene glycol, and 1,4-phenylene glycol.

The polyol may include a monohydric alcohol.

The polyester resin for use in the present invention preferably has an number average molecular weight in the range of 1,000 to 50,000, and more preferably in the range of 2,000 to 20,000. If the number average molecular weight of the polyester resin is less than 1,000, then the printed ink film will become less resistant to ethanol. If the number average molecular weight of the polyester resin is greater than 50,000, then the ink tends to become unfavorably stringy, resulting in unstable ink discharge performance.

The acrylic resin may be a copolymer of commonly used radical polymerizable monomers. Examples of such radical polymerizable monomers include the following:

Acrylic acid esters, such as methyl acrylate, ethyl acrylate, isopropyl acrylate, n-butyl acrylate, and 2-ethylhexyl acrylate;

methacrylic acid esters, such as methyl methacrylate, ethyl methacrylate, isopropyl methacrylate, n-butyl methacrylate, isobutyl methacrylate, t-butyl methacrylate, cyclohexyl methacrylate, and 2-ethylhexyl methacrylate;

aromatic vinyls, such as styrene, vinyl toluene, and α-methylstyrene;

vinyl esters, such as vinyl acetate, and vinyl propionate;

heterocyclic vinyl compounds, such as vinyl pyrrolidone;

vinyl halides, such as vinyl chloride, vinylidene chloride, and vinylidene fluoride;

vinyl ethers, such as ethyl vinyl ether and isobutyl vinyl ether; and

α-olefins, such as ethylene and propylene.

Alternatively, the acrylic acid resins may be synthesized by using polymerizable monomers containing functional groups, including acids and bases. Examples of such monomers containing functional groups include the following:

Carboxyl group-containing monomers, such as acrylic acid, methacrylic acid, maleic acid, fumaric acid, itaconic acid, mono-n-butyl maleate, mono-n-butyl fumarate, mono n-butyl itaconate, and crotonic acid;

hydroxyl group-containing (meth)acrylic acid esters, such as 2-hydroxyethyl(meth)acrylate, 2-hydroxypropyl(meth)acrylate, 3-hydroxypropyl(meth)acrylate, 4-hydroxybutyl (meth)acrylate, (2-hydroxymethyl)ethyl acrylate, (2-hydroxymethyl)butyl acrylate, (4-hydroxymethyl cyclohexyl)methyl(meth)acrylate, glycerin mono(meth) acrylate, 2-(meth)acryloyloxyethyl 2-hydroxypropyl phthalate, and 2-hydroxy-3-phenoxypropyl(meth)acrylate;

amide group-containing monomers, such as acrylamide, methacrylamide, maleic acid amide, and diacetone acrylamide;

glycidyl group-containing monomers, such as glycidyl methacrylate and allyl glycidyl ether;

cyano group-containing monomers, such as acrylonitrile and methacrylonitrile;

dienes, such as butadiene and isoprene;

hydroxyl group-containing allyl compounds, such as allyl alcohols and 2-hydroxyethyl allyl ether;

tertiary amino group-containing monomers, such as dimethylamino ethyl methacrylate and diethylamino ethyl methacrylate; and alkoxysilyl group-containing monomers, such as vinyl trimethoxysilane, vinyl triethoxysilane, vinyl triisopropoxysilane, vinyl tris(β-methoxyethoxy)silane, vinyl methyldimethoxysilane, vinyl methyldiethoxysilane, vinyl dimethylmethoxysilane, vinyl dimethylethoxysilane, 3-methacryloxypropyl trimethoxysilane, 3-methacryloxypropyl triethoxysilane, 3-methacryloxypropyl methyl dimethoxysilane, and 3-methacryloxypropyl methyl diethoxysilane.

Monomers having two or more unsaturated bonds in its molecule, such as diallyl phthalate, divinylbenzene, allyl acrylate, trimethylolpropane trimethacrylate, may also be used. These monomers may be used either individually or in combination of two or more monomers.

A variety of vinyl chloride resins may be used, including copolymers of vinyl chloride with vinyl acetate, vinylidene chloride, acrylic, maleic acid and other monomers. Preferred vinyl chloride resins are vinyl chloride/vinyl acetate copolymers, of which those with molecular weight of 30,000 or less are particularly preferred.

Any other resins that are commonly used in typical ink compositions may also be used. Examples of such resins include amino resin, such as epoxy resin, phenol resin, novolak resin, rosin-modified phenol resin, melamine, and benzoguanamine; polyamide resin; cellulose ester resin, such as cellulose diacetate, cellulose triacetate, nitro cellulose, cellulose nitrate, cellulose propionate, and cellulose acetate butyrate; and cellulose ether resins such as methyl cellulose, ethyl cellulose, benzyl cellulose, trityl cellulose, cyan ethyl cellulose, carboxymethyl cellulose, carboxyethyl cellulose, and amino ethyl cellulose. These resins may be used in combination.

The nonaqueous inkjet ink composition of the present invention preferably contains the above-described resin in an amount of 1 to 20 wt %, and more preferably in an amount of 1 to 10 wt % with respect to the weight of the ink composition. If the amount of the resin is less than 1 wt %, then the adhesion to the substrate may become insufficient, whereas the resin when present in an amount greater than 20 wt % may unfavorably increase the viscosity of the ink composition, resulting in unstable discharge performance of the ink composition.

The nonaqueous inkjet ink composition of the present invention uses a pigment-dispersing agent to help improve the dispersibility of the pigment.

The pigment-dispersing agent may be any pigment-dispersing agent used in the art to disperse pigments, including polyamide-based resins, hydroxyl group-containing carboxylic acid esters, salts of long-chain polyamino amides with high-molecular weight acid esters, salts of long-chain polyamino amides with high-molecular weight polycarboxylic acids, salts of long-chain polyamino amides with polar acid esters, high-molecular weight unsaturated acid esters, modified polyurethanes, modified polyacrylates, polyether ester-type anionic surfactants, naphthalenesulfonic acid formalin/condensate salts, aromatic sulfonic acid formalin/condensate salts, polyoxyethylene alkylphosphoric acid esters, polyoxyethylene nonylphenyl ethers, and stearyl amine acetates.

The pigment-dispersing agent for use in the nonaqueous inkjet ink composition of the present invention preferably uses a polyester polyamide resin having two or more amide groups in its molecule and having a number average molecular weight of 700 to 15,000. The amount of the pigment-dispersing agent may vary depending on the type of the pigment used and is preferably in the range of 0.1 to 15 wt %, and more preferably in the range of 0.5 to 10 wt % in order to improve the dispersivility of the pigment.

The polyester polyamide resin is produced by reacting an acid-terminated polyester resin with a polyamine compound having two or more amino groups in its molecule. Examples of the polyester polyamide resin include Solsperse 32000, Solsperse 32500, Solsperse 32600, Solsperse 33500, Solsperse 34750, Solsperse 35100 and Solsperse 37500, each manufactured by Lubrizol Corporation, and BYK9077 manufactured by BYK-Japan.

Polyester polyamine resins having less than two amide groups in their molecule provide limited dispersibility of pigments and are therefore not preferred. Polyester polyamine resins having a number average molecular weight of less than 700 provide limited dispersibility of pigments, and polyester polyamine resins having a number average molecular weight of higher than 15,000 are less dispersible in the ink and are not preferred, either.

The nonaqueous inkjet ink composition of the present invention uses an organic solvent commonly used in a typical solvent-based ink.

Examples of the organic solvent include the following:
alcohols, such as methyl alcohol, ethyl alcohol, n-propyl alcohol, isopropyl alcohol, n-butyl alcohol, tridecyl alcohol, cyclohexyl alcohol, and 2-methylcyclohexyl alcohol;
glycols, such as ethylene glycol, diethylene glycol, triethylene glycol, polyethylene glycol, propylene glycol, dipropylene glycol, and glycerin;
glycol ethers, such as ethylene glycol monomethyl ether, ethylene glycol monoethyl ether, ethylene glycol monobutyl ether, ethylene glycol diethyl ether, ethylene glycol dimethyl ether, diethylene glycol monomethyl ether, diethylene glycol monoethyl ether, diethylene glycol monobutyl ether, diethylene glycol ethyl methyl ether, diethylene glycol dimethyl ether, diethylene glycol diethyl ether, diethylene glycol dibutyl ether, propylene glycol monomethyl ether, propylene glycol monoethyl ether, propylene glycol monobutyl ether, dipropylene glycol monomethyl ether, dipropylene glycol monoethyl ether, propylene glycol dimethyl ether, dipropylene glycol dimethyl ether, propylene glycol diethyl ether, dipropylene glycol diethyl ether, ethylene glycol monomethyl acetate, ethylene glycol monoethyl acetate, ethylene glycol monobutyl acetate, diethylene glycol monomethyl acetate, ethylene glycol monomethyl ether acetate, ethylene glycol monoethyl ether acetate, ethylene glycol monobutyl ether acetate, propylene glycol monomethyl ether acetate, propylene glycol monoethyl ether acetate, diethylene glycol monoethyl acetate, diethylene glycol monobutyl acetate, and triethylene glycol monobutyl ether;
esters, such as ethyl acetate, isopropylene acetate, n-butyl acetate, methyl lactate, ethyl lactate, and butyl lactate;
ketones, such as acetone, methyl ethyl ketone, methyl isobutyl ketone, cyclohexanone, isophorone, and diacetone alcohol; and
toluene, xylene, acetonitrile, γ-butyrolactone, γ-valerolactone, and nitrogen-containing compounds, such as N-methyl-2-pyrrolidone and N-ethyl-2-pyrrolidone.

These solvents are selected in view of the compatibility to the characteristics of the head nozzles during printing, safety and readiness to dry. Different solvents may be mixed as desired.

The nonaqueous inkjet ink composition of the present invention preferably contains glycol ether as an organic solvent. Among others, the following glycol esters are particularly preferred because they ensure high ink re-solubility at the printer heads, provide high ink adhesion to non-absorbing substrates such as plastics, and provide readiness of ink to dry: diethylene glycol monomethyl ether, diethylene glycol monobutyl ether, diethylene glycol dimethyl ether, diethylene glycol ethyl methyl ether, diethylene glycol diethyl ether, diethylene glycol dibutyl ether, dipropylene glycol monomethyl ether, dipropylene glycol dimethyl ether, propylene glycol monomethyl ether acetate, diethylene glycol monoethyl ether acetate, and diethylene glycol monobutyl ether acetate.

The nonaqueous inkjet ink composition of the present invention contains a volatile anticorrosive agent or an anticorrosive agent such as imidazole compounds and thus does not clog the nozzles of the printer heads during printing on inkjet printers, thus enabling high-quality printed matter.

The nozzles of the printer heads that are exposed to ink are susceptible to corrosion caused by chemical activities of organic solvents and pigments present in inks. This often results in clogged nozzles. The addition of anticorrosive agents to the ink can prevent corrosion of the nozzles, which otherwise may cause clogged nozzles and distorted ink dots. The anticorrosive agents also provide high dispersion stability.

Examples of the volatile anticorrosive agents, which are one example of anticorrosive agents for use in the present invention, include amines, such as dicyclohexylamine carbonate, dicyclohexylamine nitrite, dicyclohexylamine, cycylohexylamine laurate, cyclohexylamine benzoate, cyclohexylamine carbamate (CHC), cyclohexylamine benzoate (CHA.BA), cyclohexylamine cyclohexane carboxylate (CHA.CHC), cyclohexylamine acrylate (CHA.AA), cyclohexylamine carbonate (JV-C), and cyclohexylamine; cyclohexylammonium caprilate, diisopropylamine nitrite, dicyclohexylammonium laurate, cyclohexylammonium carbamate ammonium benzoate, dicyclohexylammonium nitrite (DICHAN), dicyclohexylammonium salicylate (DICHA.SA), dicyclohexylammonium benzoate (DICHA.BA), diisopropylammonium benzoate (DIPA.BA), diisopropylammonium nitrite (DIPAN), nitronaphthaleneammonium nitrite (NITAN), dicyclohexylammonium caprilate, dicyclohexylammonium cyclohexane carboxylate (DICHA.CHC), dicyclohexylammonium acrylate (DICHA.AA), cyclohexylammonium carbonate, dicyclohexylammonium caprilate, and cyclohexylammonium laurate. Of these, dicyclohexylamine and cyclohexylamine cyclohexylcarbonate can effectively prevent corrosion of the heads and are therefore particularly preferred.

Examples of the imidazole compounds, which are another example of anticorrosive agents for use in the present invention, include imidazole, 2-methylimidazole, 2-ethyl-4-methylimidazole, benzimidazole, 2-phenyl-benzimidazole, 2-mercapto-methyl benzimidazole, 2-phenylimidazole, 2-phenyl-4-methylimidazole, 1-benzyl-2-methylimidazole, naphtho imidiazole, 1-cyanoethyl-2-methylimidazole, 1-aminoethyl-2-methylimidazole, 2,4-diamino-6-(2-undecyl-1-imidazolylethyl)-1,3,5-triazine, and 2-phenyl-4-methyl-5-hydroxymethylimidazole. Of these, imidazole, 2-methylimidazole, benzimidazole, and 2-ethyl-4-methylimidazole can effectively prevent corrosion of the heads and are therefore particularly preferred.

While the above-described anticorrosive agents may be used either individually or in combination, the total amount of the anticorrosive agents is preferably in the range of 0.01 to 5.0 wt %, more preferably in the range of 0.05 to 3.0 wt %, and still more preferably in the range of 0.1 to 1.0 wt % with respect to the weight of the ink composition.

The ink composition containing less than 0.01 wt % of the anticorrosive agents tends to clog the nozzles, whereas the ink composition containing more than 5.0 wt % of the anticorrosive agents may have undesirably increased viscosity due to the aggregation of pigments.

It is preferred that the water extracts of the nonaqueous inkjet ink composition of the present invention have a pH in the range of 6.0 to 10.0 in order to prevent the nozzles from being clogged during printing and thus ensure high-quality printed matter. If the pH of the water extracts is lower than 6.0, then the printer heads become susceptible to corrosion, causing clogged nozzles and distorted ink dots. If the pH is higher than 10.0, then the ink may become undesirably viscous due to the aggregation of pigments. It is particularly preferred that the water extracts have a pH in the range of 6.5 to 8.5.

The pH is measured in the following manner: To prepare the water extracts of the ink composition, 1 g of the ink composition is added to 100 g of distilled water and the mixture is thoroughly mixed and allowed to stand for a predetermined period of time. The pH of the resulting water extracts is then measured by a pH meter.

The pH of the water extracts of the ink composition can be adjusted to a range of pH 6.0 to 10.0 by adjusting the amount of the anticorrosive agent added to the ink composition.

Depending on its applications, the nonaqueous inkjet ink composition of the present invention may be used in conjunction with additives such as dyes, surface conditioning agents, UV absorbents, photostabilizers, antioxidants and plasticizers.

The nonaqueous inkjet ink composition of the present invention may be used in various types of inkjet printers, including a charge-controlled type and a type in which the ink composition spurts on demand.

The nonaqueous inkjet ink composition of the present invention is particularly suitable for use in large inkjet printers employing large formats, for example, inkjet printers intended for printing on sign displays and other articles for outdoor use. The nonaqueous inkjet ink composition of the present invention also provides high contrast in color-graphic printing and printed video-recorded images, providing significantly improved reproducibility of images.

The printed surfaces on which images (i.e., the inkjet composition) have been printed with an inkjet printer are dried at room temperature to several hundred degrees Celsius to form a dried film. The substrate on which images are to be printed in the present invention may be any substrate that does not deform or alter its properties under conditions to dry printed surfaces (i.e., ink composition), including metals, glass and plastics. More specific examples of the substrate include resin-coated sheets or films of paper and plastics.

EXAMPLES

The present invention will now be described with reference to Examples and Comparative Examples. Hereinafter, "parts" and "%" are all based on weights.

Examples 1-1 through 1-34 and Comparative Examples 1-1 through 1-5

Mixtures containing different ingredients shown in Tables 1 to 4 in corresponding amounts (parts by weight) were each kneaded in a sand mill for 3 hours to prepare ink compositions of Examples 1-1 through 1-34 and Comparative Examples 1-1 through 1-5.

The pigments used are as follows:
MONARCH 1000 (manufactured by Cabot Corp.) as carbon black;
FASTOGEN Super Magenta RG (manufactured by DIC Co., Ltd.) as a quinacridone magenta pigment;
Irgalite Blue 8700 (manufactured by Chiba Speciality Chemicals Corp) as phthalocyanine blue;
E4GN-GT (manufactured by LANXESS K.K.) as a nickel complex yellow pigment; and
TR92 (manufactured by TIOXIDE) as titanium oxide.

The resins used are as follows:
VYLON GK810 (manufactured by TOYOBO Co., Ltd., number-average molecular weight=6000, Tg=46 degrees Celsius, acid value=5 mg KOH/g, hydroxyl value=19 mg KOH/g) as a polyester resin;
DYANAL MB2660 (manufactured by MITSUBISHI RAYON Co., Ltd. weight-average molecular weight=65000, Tg=52 degrees Celsius, acid value=3 mg KOH/g) as an acrylic resin; and SOLBIN CL (manufactured by Nissin Chemical Industry Co., Ltd., vinyl chloride-vinyl acetate copolymer, number-average molecular weight=25000, Tg=70 degrees Celsius).

The volatile anticorrosive agents used are as follows:

Dicyclohexylamine (product name D-CHA-T, manufactured by New Japan Chemical Co., Ltd.); and Cyclohexylammonium cyclohexylcarbamate (product name VERZONE CRYSTAL #130, manufactured by Daiwa Fine Chemicals Co., Ltd.).

The pigment dispersing agent used are as follows:

SOLSPERSE 32000 (manufactured by Lubrizol Corporation, solid content=100%, number-average molecular weight=1500) as polyester polyamide resin A; and BYK 9077 (manufactured by BYK-Japan, solid content=99%, number-average molecular weight=1400) as polyester polyamide resin B.

The ink compositions of Examples 1-1 through 1-34 and Comparative Examples 1-1 through 1-5 were each tested and measured for the viscosity, average particle size, pH of water extracts, dispersion stability and nozzle discharge stability according to the following methods and were rated based on the following criteria.

(Measurement of Viscosity)

The viscosity of the ink compositions were measured at 20° C. using a type-B viscometer.

(Measurement of Average Particle Size)

The average particle size (D50) of the pigments in the ink compositions was measured using a laser diffraction particle size distribution analyzer ("SALD-7000" manufactured by Shimadzu Corporation).

(pH of Water Extracts)

The pH of the water extracts of the ink compositions was measured in the following manner: Using a separation funnel, 1 g of each ink composition was added dropwise to 100 g of distilled water. The mixture was thoroughly mixed and stirred and was allowed to stand for a predetermined period of time. The resulting water extracts (i.e., bottom layer) was collected and the pH was measured at 20° C. using a pH meter.

(Dispersion Stability)

Each ink composition was stored at 60° C. for 1 month in a sealed container. The ink composition was then taken out of the container and its viscosity and particle size were measured as described above. The change in the two properties were rated on the following scale:

A: The change in the viscosity and the change in the particle size were both within ±5%;

B: At least one of the change in the viscosity and the change in the particle size was greater than ±5% and ±10% or less; and C: At least one of the change in the viscosity and the change in the particle size was greater than ±10%.

(Nozzle Discharge Stability)

Each of the ink compositions was used to print images on a vinyl chloride substrate using an large-format inkjet printer. Printing was continued for 8 hours and the printer was kept out of operation in an 40° C., 65% RH environment for 1 week. After this period, printing was again continued for 1 hours. The print state was visually observed before and after the out-of-operation period and the percentage of the reproduced print state after the out-of-operation period was calculated relative to the print state prior to the out-of-operation period. The nozzle discharge stability was then rated on the following scale:

A: 90% or more of the printed dots were accurately printed at predetermined positions;

B: 80% or more and less than 90% of the printed dots were accurately printed at predetermined positions;

C: 20% or more and less than 70% of the printed dots were distorted; and

D: 70% or more of the printed dots were distorted.

The results of the measurements and ratings were as shown in Tables 1 to 4 below.

TABLE 1

| | Ink compositions | Examples |||||||||||
| | | 1-1 | 1-2 | 1-3 | 1-4 | 1-5 | 1-6 | 1-7 | 1-8 | 1-9 | 1-10 | 1-11 |
| --- | --- | --- | --- | --- | --- | --- | --- | --- | --- | --- | --- | --- |
| pigments | carbon black | 3.0 | 3.0 | 3.0 | | | | | | | | |
| | quinacridone magenta | | | | 3.0 | 3.0 | 3.0 | | | | | |
| | phthalocyanine blue | | | | | | | 3.0 | 3.0 | 3.0 | | |
| | nickel complex yellow | | | | | | | | | | 3.0 | 3.0 |
| | titanium oxide | | | | | | | | | | | |
| resins | polyester resin | 3.0 | | | 3.0 | | | 3.0 | | | 3.0 | |
| | acrylic resin | | 3.0 | | | 3.0 | | | 3.0 | | | 3.0 |
| | vinyl chloride resin | | | 3.0 | | | 3.0 | | | 3.0 | | |
| organic solvents | diethylene glycol ethyl methyl ether | 77.0 | 77.0 | 77.0 | 77.0 | 77.0 | 77.0 | 77.0 | 77.0 | 77.0 | 77.0 | 77.0 |
| | diethylene glycol diethyl ether | | | | | | | | | | | |
| | dipropylene glycol monomethyl ether | | | | | | | | | | | |
| | γ-butyrolactone | 14.0 | 14.0 | 14.0 | 14.0 | 14.0 | 14.0 | 14.0 | 14.0 | 14.0 | 14.0 | 14.0 |
| | isophorone | | | | | | | | | | | |
| volatile anticorrosive agents | dicyclohexylamine | 0.5 | 0.5 | 0.5 | 0.5 | 0.5 | 0.5 | 0.5 | 0.5 | 0.5 | 0.5 | 0.5 |
| | cyclohexylammonium cyclohexylcarbamate | | | | | | | | | | | |
| pigment-dispersing agents | polyester polyamide resin A | 2.5 | 2.5 | 2.5 | 2.5 | 2.5 | 2.5 | 2.5 | 2.5 | 2.5 | 2.5 | 2.5 |
| | polyester polyamide resin B | | | | | | | | | | | |
| ink characteristics | viscosity (mPa · S, 20° C.) | 3.3 | 3.4 | 4.0 | 3.2 | 3.3 | 4.2 | 3.4 | 3.4 | 4.4 | 3.5 | 3.6 |
| | average particle size D50 (nm) | 102 | 98 | 103 | 121 | 116 | 118 | 150 | 155 | 152 | 110 | 107 |
| | pH(20° C.) of water extracts | 7.6 | 7.8 | 7.5 | 7.6 | 7.8 | 7.8 | 7.7 | 7.6 | 7.6 | 7.6 | 7.7 |
| | dispersion stability | A | A | A | A | A | A | A | A | A | A | A |
| | nozzle discharge property | A | A | A | A | A | A | A | A | A | A | A |

TABLE 2

| | Ink compositions | Examples | | | | | | | | | | | |
|---|---|---|---|---|---|---|---|---|---|---|---|---|---|
| | | 1-12 | 1-13 | 1-14 | 1-15 | 1-16 | 1-17 | 1-18 | 1-19 | 1-20 | 1-21 | 1-22 | 1-23 |
| pigments | carbon black | | | | | | | | | | | | |
| | quinacridone magenta | | | | | | | | | | | | |
| | phthalocyanine blue | | | | | | | | | | | | |
| | nickel complex yellow | 3.0 | | | | | | | | | | | |
| | titanium oxide | | 14.0 | 14.0 | 14.0 | 14.0 | 14.0 | 14.0 | 14.0 | 14.0 | 14.0 | 1.0 | 5.0 |
| resins | polyester resin | | 2.5 | | | | | | | | | | |
| | acrylic resin | | | 2.5 | | | | | | | | | |
| | vinyl chloride resin | 3.0 | | | 2.5 | 2.5 | 2.5 | 2.5 | 2.5 | 2.5 | 2.5 | 5.5 | 5.0 |
| organic solvents | diethylene glycol ethyl methyl ether | 77.0 | 63.5 | 63.5 | 63.5 | | | | 63.5 | 63.5 | 63.5 | 75.8 | 71.6 |
| | diethylene glycol diethyl ether | | | | | 63.5 | | | | | | | |
| | dipropylene glycol monomethyl ether | | | | | | 63.5 | | | | | | |
| | γ-butyrolactone | 14.0 | 17.0 | 17.0 | 17.0 | 17.0 | 17.0 | 17.0 | 17.0 | 17.0 | 17.0 | 17.0 | 17.0 |
| | isophorone | | | | | | | 63.5 | | | | | |
| volatile anticorrosive agents | dicyclohexylamine | 0.5 | 0.5 | 0.5 | 0.5 | 0.5 | 0.5 | 0.5 | | | 0.5 | 0.5 | 0.5 |
| | cyclohexylammonium cyclohexylcarbamate | | | | | | | | | 0.5 | | | |
| pigment-dispersing agents | polyester polyamide resin A | 2.5 | 2.5 | 2.5 | 2.5 | 2.5 | 2.5 | 2.5 | 2.5 | 2.5 | | 0.2 | 0.9 |
| | polyester polyamide resin B | | | | | | | | | | 2.5 | | |
| ink characteristics | viscosity (mPa·S, 20° C.) | 4.5 | 4.9 | 4.8 | 5.3 | 4.8 | 5.1 | 5.0 | 4.9 | 4.9 | 5.0 | 4.7 | 5.1 |
| | average particle size D50 (nm) | 103 | 240 | 236 | 242 | 238 | 234 | 242 | 240 | 234 | 230 | 239 | 235 |
| | pH(20° C.) of water extracts | 7.5 | 7.4 | 7.7 | 7.8 | 7.7 | 7.5 | 7.6 | 7.7 | 7.6 | 7.8 | 7.8 | 7.9 |
| | dispersion stability | A | A | A | A | A | A | A | A | A | A | A | A |
| | nozzle discharge property | A | A | A | A | A | A | A | A | A | A | A | A |

TABLE 3

| | Ink compositions | Examples | | | | | | | | | | |
|---|---|---|---|---|---|---|---|---|---|---|---|---|
| | | 1-24 | 1-25 | 1-26 | 1-27 | 1-28 | 1-29 | 1-30 | 1-31 | 1-32 | 1-33 | 1-34 |
| pigments | carbon black | | | | | | | | | | | 10.5 |
| | quinacridone magenta | | | | | | | | | | | |
| | phthalocyanine blue | | | | | | | | | | | |
| | nickel complex yellow | | | | | | | | | | | |
| | titanium oxide | 10.0 | 15.0 | 20.0 | 14.0 | 14.0 | 14.0 | 14.0 | 14.0 | 14.0 | 14.0 | |
| resins | polyester resin | | | | | | | | | | | 3.0 |
| | acrylic resin | | | | | | | | | | | |
| | vinyl chloride resin | 4.0 | 1.3 | 0.5 | 2.495 | 2.5 | 2.5 | 2.5 | 2.5 | 2.5 | 2.5 | |
| organic solvents | diethylene glycol ethyl methyl ether | 66.7 | 63.5 | 58.4 | 64.0 | 58.5 | 63.99 | 63.0 | 61.0 | 63.5 | 63.5 | 69.5 |
| | diethylene glycol diethyl ether | | | | | | | | | | | |
| | dipropylene glycol monomethyl ether | | | | | | | | | | | |
| | γ-butyrolactone | 17.0 | 17.0 | 17.0 | 17.0 | 17.0 | 17.0 | 17.0 | 17.0 | 17.0 | 17.0 | 14.0 |
| | isophorone | | | | | | | | | | | |
| volatile anticorrosive agents | dicyclohexylamine | 0.5 | 0.5 | 0.5 | 0.005 | 5.5 | 0.01 | 1.0 | 3.0 | 0.25 | 0.25 | 0.5 |
| | cyclohexylammonium | | | | | | | | | 0.25 | | |
| | cyclohexylcarbamate | | | | | | | | | | | |
| pigment-dispersing agents | polyester polyamide resin A | 1.8 | 2.7 | 3.6 | 2.5 | 2.5 | 2.5 | 2.5 | 2.5 | 2.5 | 2.5 | 2.5 |
| | polyester polyamide resin B | | | | | | | | | | | |
| ink characteristics | viscosity (mPa·S, 20° C.) | 4.9 | 4.7 | 5.0 | 4.9 | 4.8 | 4.7 | 4.9 | 4.9 | 4.8 | 4.9 | 4.0 |
| | average particle size D50 (nm) | 245 | 235 | 240 | 240 | 231 | 238 | 240 | 241 | 238 | 238 | 100 |
| | pH(20° C.) of water extracts | 7.5 | 7.6 | 7.7 | 7.7 | 10.5 | 6.5 | 8.2 | 9.0 | 7.7 | 7.6 | 7.6 |
| | dispersion stability | A | A | A | B | B | A | A | A | B | B | B |
| | nozzle discharge property | A | A | B | B | B | A | B | A | B | B | B |

TABLE 4

| | Ink compositions | Comparative Examples | | | | |
|---|---|---|---|---|---|---|
| | | 1-1 | 1-2 | 1-3 | 1-4 | 1-5 |
| pigments | carbon black | 3.0 | | | | |
| | quinacridone magenta | | 3.0 | | | |
| | phthalocyanine blue | | | 3.0 | | |
| | nickel complex yellow | | | | 3.0 | |
| | titanium oxide | | | | | 14.0 |

TABLE 4-continued

|  | Ink compositions | Comparative Examples | | | | |
|---|---|---|---|---|---|---|
|  |  | 1-1 | 1-2 | 1-3 | 1-4 | 1-5 |
| resins | polyester resin | 3.0 | | | | |
|  | acrylic resin | | 3.0 | | | |
|  | vinyl chloride resin | | | 3.0 | 3.0 | 2.5 |
| organic solvents | diethylene glycol ethyl methyl ether | 77.0 | 77.0 | 77.0 | 77.0 | 64.0 |
|  | diethylene glycol diethyl ether | | | | | |
|  | dipropylene glycol monomethyl ether | | | | | |
|  | γ-butyrolactone | 14.5 | 14.5 | 14.5 | 14.5 | 17.0 |
|  | isophorone | | | | | |
| pigment-dispersing agents | polyester polyamide resin A | 2.5 | 2.5 | 2.5 | | 2.5 |
|  | polyester polyamide resin B | | | | 2.5 | |
| ink characteristics | viscosity (mPa · S, 20° C.) | 3.5 | 3.4 | 4.5 | 4.5 | 4.9 |
|  | average particle size D50 (nm) | 99 | 120 | 151 | 108 | 238 |
|  | pH(20° C.) of water extracts | 4.1 | 4.3 | 4.0 | 4.2 | 4.0 |
|  | dispersion stability | B | B | B | B | B |
|  | nozzle discharge property | D | D | D | D | D |

As can be seen from the data shown in Tables 1 to 3, the ink compositions of Examples 1-1 through 1-34 of the present invention each gave favorable results in each of the tested properties and each provided an ink with good print quality.

In contrast, the data shown in Table 4 indicates that each of the ink compositions of Comparative Examples 1-1 through 1-5 resulted in clogged nozzles, leading to poor print quality.

Examples 2-1 through 2-35 and Comparative Examples 2-1 through 2-5

Mixtures containing different ingredients shown in Tables 5 to 8 in corresponding amounts (parts by weight) were each kneaded in a sand mill for 3 hours to prepare ink compositions of Examples 2-1 through 2-35 and Comparative Examples 2-1 through 2-5.

The pigments, resins, and pigment-dispersing agents used were the same as those used in Examples 1-1 through 1-34 and Comparative Examples 1-1 through 1-5.

The following imidazole compounds were used in place of the anticorrosive agents used in Examples 1-1 through 1-34 and Comparative Examples 1-1 through 1-5.

Specifically, the imidazole compounds used were as follows:

imidazole (product name IZ, manufactured by Nippon Synthetic Chemical Industry Co., Ltd.);

2-methylimidazole (product name 2MI, manufactured by Nippon Synthetic Chemical Industry Co., Ltd.);

benzimidazole (product name benzimidazole, manufactured by Aldrich Co., Ltd.); and 2-ethyl-4-methylimidazole (product name 2-ethyl-4-methylimidazole, manufactured by Tokyo Chemical Industry Co., Ltd.)

The resulting ink compositions of Examples 2-1 through 2-35 and Comparative Examples 2-1 through 2-5 were tested, measured and rated for the viscosity, average particle size, pH of water extracts, dispersion stability and nozzle discharge stability in the manner described above with respect to Examples 1-1 through 1-34 and Comparative Examples 1-1 through 1-5.

The results of the measurements and ratings were as shown in Tables 5 to 8 below.

TABLE 5

|  |  | Examples | | | | | | | | | | |
|---|---|---|---|---|---|---|---|---|---|---|---|---|
|  |  | 2-1 | 2-2 | 2-3 | 2-4 | 2-5 | 2-6 | 2-7 | 2-8 | 2-9 | 2-10 | 2-11 |
| pigments | carbon black | 3.0 | 3.0 | 3.0 | | | | | | | | |
|  | quinacridone magenta | | | | 3.0 | 3.0 | 3.0 | | | | | |
|  | phthalocyanine blue | | | | | | | 3.0 | 3.0 | 3.0 | | |
|  | nickel complex yellow | | | | | | | | | | 3.0 | 3.0 |
|  | titanium oxide | | | | | | | | | | | |
| resins | polyester resin | 3.0 | | | 3.0 | | | 3.0 | | | 3.0 | |
|  | acrylic resin | | 3.0 | | | 3.0 | | | 3.0 | | | 3.0 |
|  | vinyl chloride resin | | | 3.0 | | | 3.0 | | | 3.0 | | |
| organic solvents | diethylene glycol ethyl methyl ether | 77.0 | 77.0 | 77.0 | 77.0 | 77.0 | 77.0 | 77.0 | 77.0 | 77.0 | 77.0 | 77.0 |
|  | diethylene glycol diethyl ether | | | | | | | | | | | |
|  | dipropylene glycol monomethyl ether | | | | | | | | | | | |
|  | γ-butyrolactone | 14.0 | 14.0 | 14.0 | 14.0 | 14.0 | 14.0 | 14.0 | 14.0 | 14.0 | 14.0 | 14.0 |
|  | isophorone | | | | | | | | | | | |
| imidazole compunds | imidazole | 0.5 | 0.5 | 0.5 | 0.5 | 0.5 | 0.5 | 0.5 | 0.5 | 0.5 | 0.5 | 0.5 |
|  | 2-methylimidazole | | | | | | | | | | | |
|  | benzimidazole | | | | | | | | | | | |
| pigment-dispersing agents | polyester polyamide resin A | 2.5 | 2.5 | 2.5 | 2.5 | 2.5 | 2.5 | 2.5 | 2.5 | 2.5 | 2.5 | 2.5 |
|  | polyester polyamide resin B | | | | | | | | | | | |
| ink characteristics | viscosity (mPa · S, 20° C.) | 3.3 | 3.4 | 4.0 | 3.2 | 3.3 | 4.2 | 3.4 | 3.4 | 4.4 | 3.5 | 3.6 |
|  | average particle size D50 (nm) | 100 | 98 | 103 | 120 | 116 | 118 | 150 | 153 | 152 | 110 | 105 |
|  | pH(20° C.) of water extracts | 7.5 | 7.8 | 7.5 | 7.6 | 7.8 | 7.7 | 7.7 | 7.6 | 7.5 | 7.6 | 7.7 |
|  | dispersion stability | A | A | A | A | A | A | A | A | A | A | A |
|  | nozzle discharge property | A | A | A | A | A | A | A | A | A | A | A |

TABLE 6

| | | Examples | | | | | | | | | | | |
|---|---|---|---|---|---|---|---|---|---|---|---|---|---|
| | | 2-12 | 2-13 | 2-14 | 2-15 | 2-16 | 2-17 | 2-18 | 2-19 | 2-20 | 2-21 | 2-22 | 2-23 |
| pigments | carbon black | | | | | | | | | | | | |
| | quinacridone magenta | | | | | | | | | | | | |
| | phthalocyanine blue | | | | | | | | | | | | |
| | nickel complex yellow | 3.0 | | | | | | | | | | | |
| | titanium oxide | | 14.0 | 14.0 | 14.0 | 14.0 | 14.0 | 14.0 | 14.0 | 14.0 | 14.0 | 1.0 | 5.0 |
| resins | polyester resin | | 2.5 | | | | | | | | | | |
| | acrylic resin | | | 2.5 | | | | | | | | | |
| | vinyl chloride resin | 3.0 | | | 2.5 | 2.5 | 2.5 | 2.5 | 2.5 | 2.5 | 2.5 | 5.5 | 5.0 |
| organic solvents | diethylene glycol ethyl methyl ether | 77.0 | 63.5 | 63.5 | 63.5 | | | | 63.5 | 63.5 | 63.5 | 75.8 | 71.6 |
| | diethylene glycol diethyl ether | | | | | 63.5 | | | | | | | |
| | dipropylene glycol monomethyl ether | | | | | | 63.5 | | | | | | |
| | γ-butyrolactone | 14.0 | 17.0 | 17.0 | 17.0 | 17.0 | 17.0 | 17.0 | 17.0 | 17.0 | 17.0 | 17.0 | 17.0 |
| | isophorone | | | | | | | 63.5 | | | | | |
| imidazole compounds | imidazole | 0.5 | 0.5 | 0.5 | 0.5 | 0.5 | 0.5 | 0.5 | | | 0.5 | 0.5 | 0.5 |
| | 2-methylimidazole | | | | | | | | 0.5 | | | | |
| | benzimidazole | | | | | | | | | 0.5 | | | |
| pigment-dispersing agents | polyester polyamide resin A | 2.5 | 2.5 | 2.5 | 2.5 | 2.5 | 2.5 | 2.5 | 2.5 | 2.5 | | 0.2 | 0.9 |
| | polyester polyamide resin B | | | | | | | | | | 2.5 | | |
| ink characteristics | viscosity (mPa·S, 20° C.) | 4.5 | 4.8 | 4.8 | 5.3 | 4.8 | 5.2 | 5.0 | 4.9 | 4.8 | 4.9 | 4.7 | 5.0 |
| | average particle size D50 (nm) | 103 | 240 | 236 | 242 | 238 | 232 | 241 | 240 | 234 | 230 | 238 | 235 |
| | pH(20° C.) of water extracts | 7.5 | 7.4 | 7.6 | 7.8 | 7.7 | 7.5 | 7.6 | 7.5 | 7.6 | 7.8 | 7.8 | 7.9 |
| | dispersion stability | A | A | A | A | A | A | A | A | A | A | A | A |
| | nozzle discharge property | A | A | A | A | A | A | A | A | A | A | A | A |

TABLE 7

| | | Examples | | | | | | | | | | | |
|---|---|---|---|---|---|---|---|---|---|---|---|---|---|
| | | 2-24 | 2-25 | 2-26 | 2-27 | 2-28 | 2-29 | 2-30 | 2-31 | 2-32 | 2-33 | 2-34 | 2-35 |
| pigments | carbon black | | | | | | | | | | | 10.5 | |
| | quinacridone magenta | | | | | | | | | | | | |
| | phthalocyanine blue | | | | | | | | | | | | |
| | nickel complex yellow | | | | | | | | | | | | |
| | titanium oxide | 10.0 | 15.0 | 20.0 | 14.0 | 14.0 | 14.0 | 14.0 | 14.0 | 14.0 | 14.0 | | 14.0 |
| resins | polyester resin | | | | | | | | | | | 3.0 | |
| | acrylic resin | | | | | | | | | | | | |
| | vinyl chloride resin | 4.0 | 1.3 | 0.5 | 2.495 | 2.5 | 2.5 | 2.5 | 2.5 | 2.5 | 2.5 | | 2.5 |
| organic solvents | diethylene glycol ethyl methyl ether | 66.7 | 63.5 | 58.4 | 64.0 | 58.5 | 63.99 | 63.0 | 61.0 | 63.5 | 63.5 | 69.5 | 63.5 |
| | diethylene glycol diethyl ether | | | | | | | | | | | | |
| | dipropylene glycol monomethyl ether | | | | | | | | | | | | |
| | γ-butyrolactone | 17.0 | 17.0 | 17.0 | 17.0 | 17.0 | 17.0 | 17.0 | 17.0 | 17.0 | 17.0 | 14.0 | 17.0 |
| | isophorone | | | | | | | | | | | | |
| imidazole compounds | imidazole | 0.5 | 0.5 | 0.5 | 0.005 | 5.5 | 0.01 | 1.0 | 3.0 | 0.25 | 0.25 | 0.5 | |
| | 2-methylimidazole | | | | | | | | | 0.25 | | | |
| | benzimidazole | | | | | | | | | | 0.25 | | |
| | 2-ethyl-4-methylimidazole | | | | | | | | | | | | 0.5 |
| pigment-dispersing agents | polyester polyamide resin A | 1.8 | 2.7 | 3.6 | 2.5 | 2.5 | 2.5 | 2.5 | 2.5 | 2.5 | 2.5 | 2.5 | 2.5 |
| | polyester polyamide resin B | | | | | | | | | | | | |
| ink characteristics | viscosity (mPa·S, 20° C.) | 4.9 | 4.7 | 5.0 | 4.9 | 4.8 | 4.7 | 4.8 | 4.9 | 4.8 | 5.0 | 4.0 | 4.9 |
| | average particle size D50 (nm) | 245 | 235 | 238 | 240 | 233 | 238 | 239 | 241 | 238 | 236 | 100 | 230 |
| | pH(20° C.) of water extracts | 7.5 | 7.6 | 7.7 | 4.5 | 10.5 | 6.5 | 8.2 | 9.0 | 7.5 | 7.6 | 7.6 | 7.5 |
| | dispersion stability | A | A | A | B | B | A | A | A | B | B | B | A |
| | nozzle discharge property | A | A | B | B | B | B | A | B | B | B | B | A |

TABLE 8

| | | Comparative Examples | | | | |
|---|---|---|---|---|---|---|
| | Ink compositions | 2-1 | 2-2 | 2-3 | 2-4 | 2-5 |
| pigments | carbon black | 3.0 | | | | |
| | quinacridone magenta | | 3.0 | | | |
| | phthalocyanine blue | | | 3.0 | | |
| | nickel complex yellow | | | | 3.0 | |
| | titanium oxide | | | | | 14.0 |

TABLE 8-continued

|  | Ink compositions | Comparative Examples | | | | |
|---|---|---|---|---|---|---|
|  |  | 2-1 | 2-2 | 2-3 | 2-4 | 2-5 |
| resins | polyester resin | 3.0 | | | | |
|  | acrylic resin | | 3.0 | | | |
|  | vinyl chloride resin | | | 3.0 | 3.0 | 2.5 |
| organic solvents | diethylene glycol ethyl methyl ether | 77.0 | 77.0 | 77.0 | 77.0 | 64.0 |
|  | diethylene glycol diethyl ether | | | | | |
|  | dipropylene glycol monomethyl ether | | | | | |
|  | γ-butyrolactone | 14.5 | 14.5 | 14.5 | 14.5 | 17.0 |
|  | isophorone | | | | | |
| imidazole compounds | imidazole | | | | | |
|  | 2-methylimidazole | | | | | |
|  | benzimidazole | | | | | |
| pigment-dispersing agents | polyester polyamide resin A | 2.5 | 2.5 | 2.5 | | 2.5 |
|  | polyester polyamide resin B | | | | 2.5 | |
| ink characteristics | viscosity (mPa·S, 20° C.) | 3.5 | 3.4 | 4.5 | 4.5 | 4.9 |
|  | average particle size D50 (nm) | 99 | 120 | 151 | 108 | 238 |
|  | pH(20° C.) of water extracts | 4.1 | 4.3 | 4.0 | 4.2 | 4.0 |
|  | dispersion stability | B | B | B | B | B |
|  | nozzle discharge property | D | D | D | D | D |

As can be seen from the data shown in Tables 5 to 7, the ink compositions of Examples 2-1 through 2-35 of the present invention each gave favorable results in each of the tested properties and each provided an ink with good print quality.

In contrast, the data shown in Table 8 indicates that each of the ink compositions of Comparative Examples 2-1 through 2-5 resulted in clogged nozzles, leading to poor print quality.

The invention claimed is:

1. A nonaqueous inkjet ink composition containing a pigment, a resin, a pigment-dispersing agent and an organic solvent, along with an anticorrosive agent, wherein;
   the resin comprises a vinyl chloride resin; and
   the anticorrosive agent is dicyclohexylamine, cyclohexylammonium cyclohexylcarbamate, imidazole, 2-methylimidazole, benzimidazole, or 2-ethyl-4-methylimidazol.

2. The nonaqueous inkjet ink composition according to claim 1, wherein water extracts from a mixture of 1 g of the nonaqueous inkjet ink composition with 100 g of water have a pH of 6.0 to 10.0.

3. The nonaqueous inkjet ink composition according to claim 1, wherein the pigment is titanium oxide and is contained in the ink composition in an amount of 1.0 to 20.0 wt %.

4. The nonaqueous inkjet ink composition according to claim 1, wherein the anticorrosive agent is contained in the ink composition in an amount of 0.01 to 5.0 wt %.

5. The nonaqueous inkjet ink composition according to claim 1, wherein the pigment has a volume-average particle size of 50 to 400 nm.

6. The nonaqueous inkjet ink composition according to claim 1, wherein the pigment-dispersing agent is a polyester polyamide resin containing two or more amide groups in its molecule and having a number-average molecular weight of 700 to 15000.

7. The nonaqueous inkjet ink composition according to claim 1, wherein the organic solvent comprises a glycol ether.

* * * * *